United States Patent
Suzuki (10) Patent No.: US 9,958,274 B2
(45) Date of Patent: May 1, 2018

(54) MAGNETIC FIELD BASED LOCATION DETERMINATION

(71) Applicant: FUJITSU LIMITED, Kawasaki-shi, Kanagawa (JP)

(72) Inventor: Motoya Suzuki, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 14/983,416

(22) Filed: Dec. 29, 2015

(65) Prior Publication Data
US 2017/0184402 A1    Jun. 29, 2017

(51) Int. Cl.
G01B 7/14    (2006.01)
G01B 7/30    (2006.01)
G01R 33/00   (2006.01)
G01C 21/08   (2006.01)

(52) U.S. Cl.
CPC .................................. *G01C 21/08* (2013.01)

(58) Field of Classification Search
CPC .... G01R 15/207; G01R 33/04; G01R 33/072; G01R 33/09; Y10T 29/49073; H05K 2201/10151
USPC ................ 324/207.11, 200, 207.3, 244, 253
See application file for complete search history.

(56) References Cited

U.S. PATENT DOCUMENTS

| | | | |
|---|---|---|---|
| 3,965,412 A | 6/1976 | Yungul | |
| 5,764,055 A * | 6/1998 | Kawase | G01R 33/02 324/207.13 |
| 7,420,366 B1 * | 9/2008 | In | G01R 33/04 324/244 |
| 2006/0181272 A1 * | 8/2006 | Zhang | G01R 33/04 324/253 |
| 2011/0241656 A1 | 10/2011 | Piemonte et al. | |
| 2013/0179075 A1 | 7/2013 | Haverinen | |
| 2016/0124059 A1 * | 5/2016 | Notaros | G01R 33/34046 324/309 |
| 2016/0124060 A1 * | 5/2016 | Giri | G01R 33/543 324/309 |
| 2016/0202331 A1 * | 7/2016 | Chen | G01R 33/10 324/205 |

FOREIGN PATENT DOCUMENTS

WO    2013/025278 A1    2/2013

* cited by examiner

*Primary Examiner* — Giovanni Astacio-Oquendo
(74) *Attorney, Agent, or Firm* — Maschoff Brennan (57) ABSTRACT

A method may include obtaining magnetic field information that corresponds to a location. The magnetic field information may be based on an output reading of a magnetometer of an electronic device. The method may further include obtaining orientation information that corresponds to a device orientation of the electronic device that corresponds to the magnetic field information. The orientation information may be based on an output reading of one or more inertial sensors and may indicate the device orientation. The method may further include adjusting the magnetic field information based on the orientation information to generate normalized magnetic field information that is normalized with respect to a map-coordinate system of a magnetic field map. The normalized magnetic field information and the magnetic field map may be used to determine that the electronic device is at the location at the time that the output reading of the magnetometer is obtained.

20 Claims, 5 Drawing Sheets

MAGNETIC FIELD BASED LOCATION DETERMINATION

FIELD

The embodiments discussed in the present disclosure are related to magnetic field based indoor location determination.

BACKGROUND

Many portable electronic devices (e.g., cell phones, tablets, etc.) use location determination technology such as Global Positioning System (GPS) to estimate a location of the electronic devices. However, some technologies, such as GPS, may not work very well indoors because of weak signal strength. In some instances, some techniques have been developed in which magnetic field readings performed indoors may be used to estimate a location while the electronic device is indoors.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining magnetic field information that corresponds to a location. The magnetic field information may be based on an output reading of a magnetometer of an electronic device. The method may further include obtaining orientation information that corresponds to a device orientation of the electronic device at a time that the output reading of the magnetometer is obtained. The orientation information may be based on an output reading of one or more inertial sensors and may indicate the device orientation with respect to a map-coordinate system of a magnetic field map. The method may further include adjusting the magnetic field information based on the orientation information to generate normalized magnetic field information that is normalized with respect to the map-coordinate system. The normalized magnetic field information and the magnetic field map may be used to determine that the electronic device is at the location at the time that the output reading of the magnetometer is obtained.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Information related to magnetic field readings (referred to as "magnetic field information") may be used to determine a location of an electronic device. For example, the Earth's magnetic field may vary based on location such that readings of the Earth's magnetic field may indicate location. In some instances, magnetic field readings may be used to determine a location that may be indoors. For example, the electronic device may be configured to read a magnetic field while in a building to obtain magnetic field information ("device magnetic field information"). The device magnetic field information may be compared with a magnetic field map that may include magnetic field information ("map magnetic field information") previously read at various locations within the building. The comparison between the magnetic field map and the device magnetic field information may be such that a location of the electronic device may be determined based on the device magnetic field information.

For example, the device magnetic field information may be matched with particular map magnetic field information. The particular map magnetic field information may be obtained at a particular location such that it may correspond to the particular location. As such, it may be determined that the electronic device is at the particular location at the time of obtaining the device magnetic field information based on the device magnetic field information substantially matching the particular map magnetic field information and based on the particular map magnetic field information corresponding to the particular location. In some instances, the device and map magnetic field information may be based on the Earth's magnetic field.

In some instances magnetic field information that may be obtained by electronic devices may also be based on an orientation of the electronic devices while the corresponding magnetic field readings are being made. For example, first magnetic field information may be obtained from first magnetic field readings performed by an electronic device in a first orientation at a particular location. Additionally, second magnetic field information may be obtained from second magnetic field readings performed by the electronic device in a second orientation at the particular location. The first magnetic field information and the second magnetic field information may differ because of differences in the first orientation and the second event though they may both correspond to substantially the same particular location. Therefore, in some instances, particular map magnetic field information that may correspond to a particular location may not necessarily match with particular device magnetic field information obtained at the particular location due to differences in device orientations when the magnetic field readings that correspond to particular map magnetic field information and the particular device magnetic field information.

Some embodiments described in the present disclosure relate to methods and systems of normalizing device magnetic field information. As detailed below, the normalized device magnetic field information may be generated to compensate for differences in magnetic field readings that may be caused by different orientations at with respect to map magnetic field information and device magnetic field information. In some embodiments, the normalized magnetic field information may be compared with the magnetic field map to determine a location of the electronic device while the electronic device is inside of the building. As such, according to some embodiments of the present disclosure, errors in location determinations that may be caused by different orientations may be reduced or eliminated.

Embodiments of the present disclosure are explained with reference to the accompanying drawings.

Figure 1A:
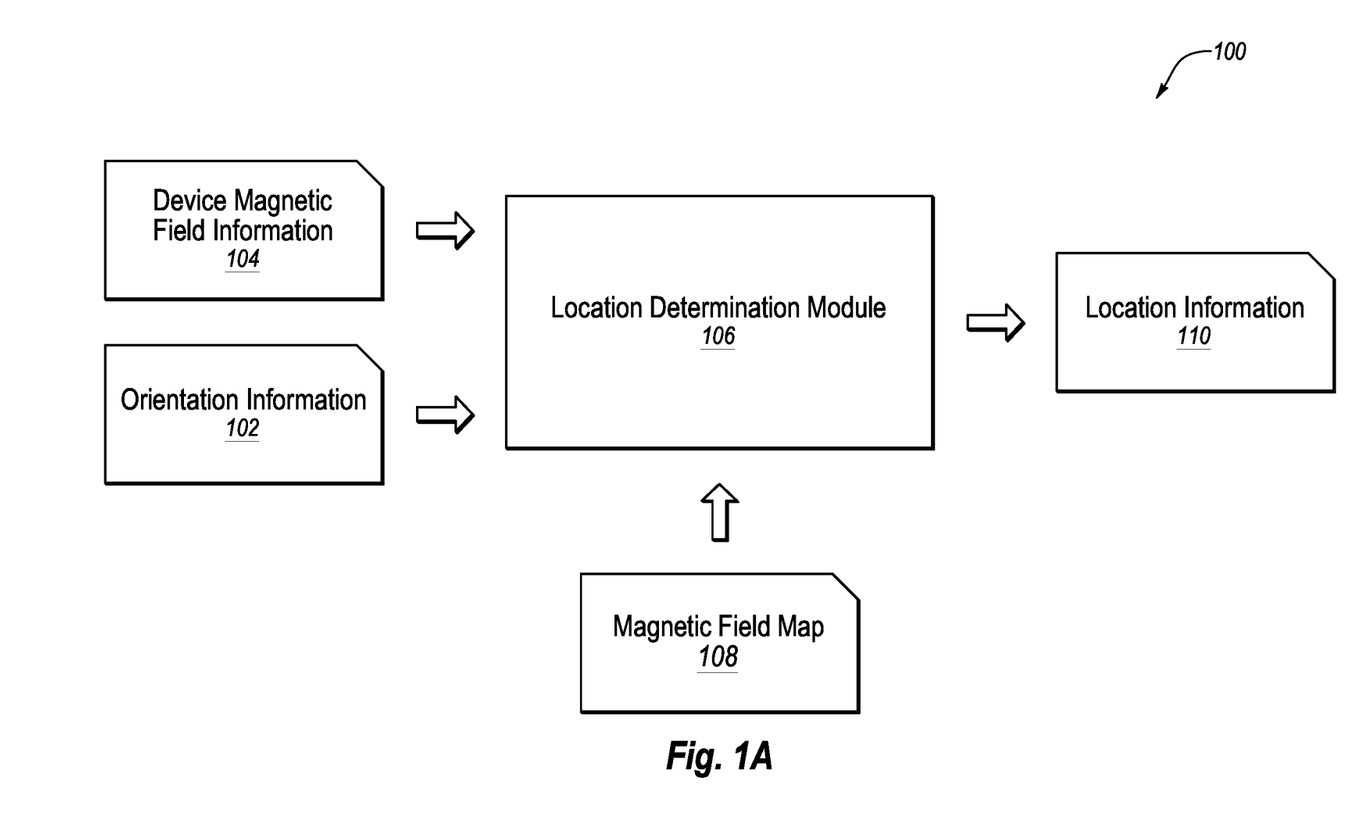
FIG. 1A is a diagram representing an example system configured to determine a location based on magnetic field information.

FIG. 1A is a diagram representing an example system 100 configured to determine a location based on magnetic field information, according to one or more embodiments of the present disclosure. The system 100 may include a location determination module 106 configured to determine location information 110 based on device magnetic field information 104, orientation information 102, and a magnetic field map 108.

The magnetic field map 108 may include map magnetic field information that may be generated from multiple magnetic field readings that may be made at multiple locations. The magnetic field readings that may be obtained to generate the map magnetic field information may be referred to as "map magnetic field readings." In some embodiments, the locations may be within one or more buildings such that the map magnetic field may correspond to locations that may be indoors.

The map magnetic field readings may be obtained via any suitable system, apparatus, or device. For example, the map magnetic field readings may be obtained via one or more first magnetometers that may be included in a first electronic device. In some embodiments, the map magnetic field readings may be obtained with the first electronic device at a first orientation while each of the map magnetic field readings are obtained.

The map magnetic field information may indicate a direction of the magnetic field that may be indicated by the map magnetic field readings. For example, in some embodiments, the map magnetic field information at each location may include a map magnetic field vector. In some embodiments, the map magnetic field vectors may be based on a map-coordinate system. In particular, in some embodiments, the map magnetic field vectors may be expressed as having a magnitude and a direction in which directional components of the magnitude are expressed with respect to the map-coordinate system. Additionally, the map-coordinate system may be based on the first orientation of the first electronic device while obtaining the map magnetic field readings.

Figure 1B:
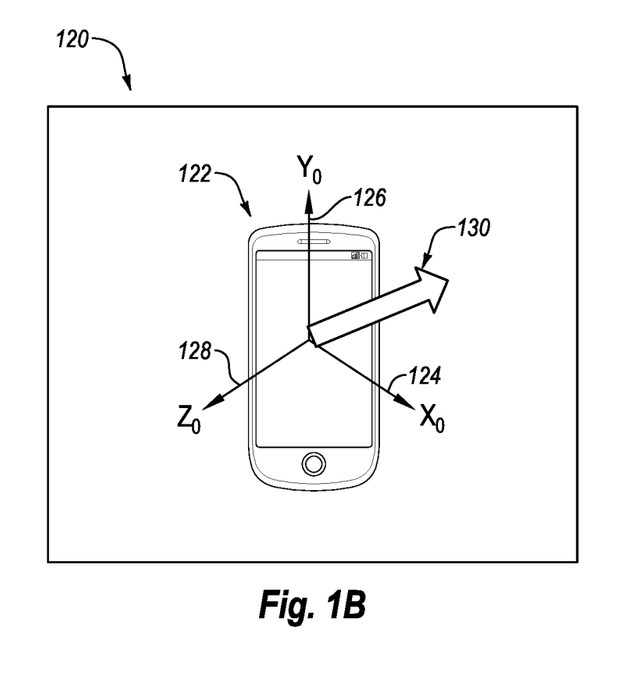
FIG. 1B illustrates an example map magnetic field vector that is based on a map-coordinate system.

By way of example, FIG. 1B illustrates an example map magnetic field vector 130 that is based on a map-coordinate system 120, according to one or more embodiments of the present disclosure. The map-coordinate system 120 may include a Cartesian-type coordinate system with an x-axis 124, a y-axis 126, and a z-axis 128.

In some embodiments, the x-axis 124, the y-axis 126, and the z-axis 128 may be aligned with respect to an electronic device 122 that may be used to generate the magnetic field map 108 of which the map magnetic field vector 130 may be included. As such, in some embodiments an orientation of the map-coordinate system 120 (e.g., the orientations of the x-axis 124, the y-axis 126, and the z-axis 128) may be based on an orientation of the electronic device 122 at the time of generating the magnetic field map 108.

The map magnetic field vector 130 may indicate a magnitude and a direction of the magnetic field obtained from map magnetic field readings used to obtain the map magnetic field vector 130. In some embodiments, the map magnetic field vector 130 may indicate the magnitude and direction of the measured magnetic field with respect to the map-coordinate system 120. For example, the map magnetic field vector 130 may include an x-component that may indicate how much of the magnitude of the map magnetic field vector 130 is in an x-direction that runs along the x-axis 124. Additionally, the map magnetic field vector 130 may include a y-component that may indicate how much of the magnitude of the map magnetic field vector 130 is in a y-direction that runs with the y-axis 126. Further, the map magnetic field vector 130 may include a z-component that may indicate how much of the magnitude of the map magnetic field vector 130 is in a z-direction that runs with the z-axis 128.

In some embodiments, the map magnetic field vector 130 may be described by the following expression "$M_0(x_0, y_0, z_0)$." In the foregoing expression, "$M_0$" may indicate the overall magnitude of the map magnetic field vector 130; "$x_0$" may indicate the x-component of the map magnetic field vector 130 with respect to the x-axis 124; "$y_0$" may indicate the y-component of the map magnetic field vector 130 with respect to the y-axis 126; and "$z_0$" may indicate the z-component of the map magnetic field vector 130 with respect to the z-axis 128. Other map magnetic field vectors may be represented using similar expressions.

Returning to FIG. 1A, the device magnetic field information 104 may be based on device magnetic field readings that may be obtained via any suitable system, apparatus, or device. For example, the device magnetic field readings that may correspond to the device magnetic field information 104 may be obtained via the first magnetometers that may be included in the first electronic device or may be obtained via one or more second magnetometers that may be included in a second electronic device. In order to simplify the below explanation, the magnetic field map 108 is described as being based on map magnetic field readings obtained from first magnetometers of the first electronic device and the device magnetic field information 104 is described as being based on device magnetic field readings obtained from second magnetometers of the second electronic device. However, in some embodiments, both the magnetic field map 108 and the device magnetic field information 104 may be based on magnetic field readings obtained from magnetometers of the same electronic device.

In some embodiments, the device magnetic field information 104 may be obtained at a location that may be included in the magnetic field map 108. In these or other embodiments, the device magnetic field information 104 may be obtained at a time after the generation of the magnetic field map 108.

In some embodiments, the device magnetic field information 104 may include one or more device magnetic field vectors that may be similar to the map magnetic field vectors described above. For example, each device magnetic field vector may indicate a magnitude and a direction of a measured magnetic field. In some embodiments, each of the device magnetic field vectors may be based on a device-coordinate system. In particular, in some embodiments, the device magnetic field vectors may be expressed as having a magnitude and a direction in which directional components of the magnitude are expressed with respect to the corresponding device-coordinate system.

In some embodiments, the device-coordinate systems may be based on an orientation of the electronic device at the time that the device magnetic field readings that correspond to the device magnetic field information 104 are obtained. In some instances, the orientation during different device magnetic field readings may differ such that the device-coordinate systems for different magnetic field information 104 may differ. Further, in some instances, the device-coordinate system may differ from the map-coordinate system due to differences in device orientations with respect to when the map magnetic field readings are made as compared to when the device magnetic field readings are made. As such, in some instances the device magnetic field information 104 that corresponds to a particular location may differ from map magnetic field information that corresponds to substantially the same particular location.

Figure 1C:
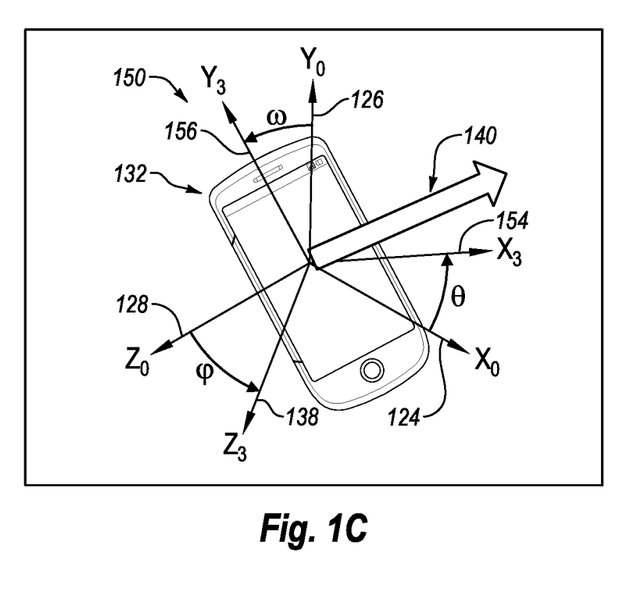
FIG. 1C illustrates an example device magnetic field vector that is based on a device-coordinate system.

By way of example, FIG. 1C illustrates an example device magnetic field vector 140 that is based on a device-coordinate system 150, according to one or more embodiments of the present disclosure. The device-coordinate system 150 may include a Cartesian-type coordinate system with an x-axis 154, a y-axis 156, and a z-axis 158.

In some embodiments, the x-axis 154, the y-axis 156, and the z-axis 158 may be aligned with respect to an electronic device 132. As such, in some embodiments an orientation of the device-coordinate system (e.g., the orientations of the x-axis 154, the y-axis 156, and the z-axis 158) may be based on an orientation of the electronic device 132.

The device magnetic field vector 140 may indicate a magnitude and a direction of the measured magnetic field that corresponds to device magnetic field readings used to obtain the device magnetic field vector 140. In some embodiments, the device magnetic field vector 140 may indicate the magnitude and direction of the measured magnetic field with respect to the device-coordinate system 150. For example, the device magnetic field vector 140 may include an x-component that may indicate how much of the magnitude of the device magnetic field vector 140 is in an x-direction that runs along the x-axis 154. Additionally, the device magnetic field vector 140 may include a y-component that may indicate how much of the magnitude of the device magnetic field vector 140 is in a y-direction that runs with the y-axis 156. Further, the device magnetic field vector 140 may include a z-component that may indicate how much of the magnitude of the device magnetic field vector 140 is in a z-direction that runs with the z-axis 158.

In some embodiments, the device magnetic field vector 140 may be described by the following expression "$M_1(x_1, y_1, z_1)$." In the foregoing expression, "$M_1$" may indicate the overall magnitude of the device magnetic field vector 140; "$x_1$" may indicate the x-component of the device magnetic field vector 140 with respect to the x-axis 154; "$y_1$" may indicate the y-component of the device magnetic field vector 140 with respect to the y-axis 156; and "$z_1$" may indicate the z-component of the device magnetic field vector 140 with respect to the z-axis 158. Other device magnetic field vectors may be represented using similar expressions.

In the depicted examples of FIGS. 1B and 1C, The device magnetic field vector 140 may be based on device magnetic field readings that may be obtained at substantially the same location that the map magnetic field readings that correspond to the map magnetic field vector 130 of FIG. 1B. Additionally, in the depicted examples of FIGS. 1B and 1C, the orientation of the device 122 at the time that the magnetic field is measured to obtain the map magnetic field vector 130 and the orientation of the electronic device 132 at the time that the magnetic field is measured to obtain the device magnetic field vector 140 may be such that the map-coordinate system 120 and the device-coordinate system 150 may not be aligned.

For example, FIG. 1C depicts the x-axis 124, the y-axis 126, and the z-axis 128 and their orientations with respect to the map-coordinate system 120. FIG. 1C also depicts the x-axis 154, the y-axis 156, and the z-axis 158 and their orientations with respect to the device-coordinate system 150. The x-axis 154 may be offset from the x-axis 124 in an xy-plane by a first offset angle "θ" in the illustrated example of FIG. 1C. The y-axis 156 may be offset from the y-axis 126 in a yz-plane by a second offset angle "ω" in the illustrated example of FIG. 1C. In addition, The z-axis 128 may be offset from the z-axis 158 in an xz-plane by a third offset angle "φ" in the illustrated example of FIG. 1C.

Because the device-coordinate system is based on the orientation of the electronic device 132, the offset angles may also indicate or be used as orientation angles of the electronic device 132 with respect to the map-coordinate system. Additionally or alternatively, the offset angles may be used to represent the orientation of the electronic device 132 with respect to the map-coordinate system 120 using the following expression in some embodiments: "r(θ, ω, φ)."

The first offset angle may cause the respective x and y components of the map magnetic field vector 130 and the device magnetic field vector 140 to be different even if the map magnetic field vector 130 and the device magnetic field vector 140 correspond to substantially the same location. Additionally or alternatively, the second offset angle may cause the respective z and y components of the map magnetic field vector 130 and the device magnetic field vector 140 to be different even if the map magnetic field vector 130 and the device magnetic field vector 140 correspond to substantially the same location. Additionally or alternatively, the third offset angle may cause the respective x and z components of the map magnetic field vector 130 and the device magnetic field vector 140 to be different even if the map magnetic field vector 130 and the device magnetic field vector 140 correspond to substantially the same location.

Returning to FIG. 1A, in some embodiments, the orientation information 102 may indicate an orientation of the second electronic device with respect to the map-coordinate system. The orientation may correspond to the orientation of the second electronic device while device magnetic field readings were being made by the second electronic device. In some embodiments, the orientation information 102 may indicate offset angles, such as those described above with respect to FIG. 1C, between a device-coordinate system that corresponds to the device magnetic field information 104 and the map-coordinate system of the magnetic field map 108. The offset angles may indicate the orientation of the second electronic device with respect to the map-coordinate system as indicated above.

In some embodiments, the orientation information 102 may include first inertial information of the first electronic device while the first electronic device was measuring magnetic fields with respect to generation of the magnetic field map 108 (e.g., performing map magnetic field readings). In these or other embodiments, the orientation information 102 may include second inertial information of the second electronic device while the second electronic device was measuring magnetic fields that correspond to the device magnetic field information 104 (e.g., performing device magnetic field readings). The first and second inertial information may be referred to generally as "inertial information" in the present disclosure.

The inertial information may indicate acceleration, angular speed, or trajectory of movement in three dimensions of the corresponding electronic device. Such information may be used to determine an orientation in space of the corresponding device according to any suitable technique. As indicated above, the orientations of the coordinate systems used to express magnetic field information may be based on the orientations of the respective electronic devices such that the inertial information may be used to determine the orientations of the map-coordinate system and the device-coordinate system with respect to each other.

In some embodiments, the first inertial information may be correlated with map magnetic field information that may be included in the magnetic field map 108. The correlation may allow for determining the first orientation of the first device while the first electronic device was measuring magnetic fields with respect to generation of the magnetic field map 108. In these or other embodiments, the orientation of the map-coordinate system may be determined based on the determined first orientation. In some embodiments, the first inertial information may be obtained with respect to individual map magnetic field readings that correspond to map magnetic field vectors such that first inertial information may be correlated with individual map magnetic field vectors. In these or other embodiments, the orientation of the map-coordinate system may be determined with respect to the individual map magnetic field vectors. In some embodiments, the orientation information 102 may include the orientation of the map-coordinate system of the magnetic field map 108.

Additionally or alternatively, in some embodiments, the second inertial information may be correlated with the device magnetic field information 104. The correlation may allow for determining the second orientation of the second electronic device while the second electronic device was measuring magnetic fields that correspond to the device magnetic field information. In these or other embodiments, the orientation of the device-coordinate system may be determined based on the determined second orientation. In some embodiments, the second inertial information may be obtained with respect to individual device magnetic field readings that correspond to device magnetic field vectors such that second inertial information may be correlated with individual device magnetic field vectors. In these or other embodiments, the orientation of the device-coordinate system may be determined with respect to the individual device magnetic field vectors such that it may vary with respect to the different device magnetic field vectors. In some embodiments, the orientation information 102 may include the orientations of the device-coordinate systems of which the device magnetic field information 104 may be based.

In some embodiments, offset angles between axes of the map-coordinate system and axes of the device-coordinate systems may be determined with respect to the device magnetic field information 104 based on the orientation information 102 using any suitable technique. For example, the offset angles "$\theta$," "$\omega$," and "$\varphi$" of FIG. 1C may be determined based on first inertial information of the electronic device 122 and second inertial information of the electronic device 132 to determine respective orientations of the map-coordinate system 120 and of the device-coordinate system 150. The orientations may then be used to determine the offset angles "$\theta$," "$\omega$," and "$\varphi$."

The location determination module 106 ("location module 106") may include code and routines configured to enable a computing device to determine location information 110. Additionally or alternatively, the location module 106 may be implemented using hardware including a processor, a microprocessor (e.g., to perform or control performance of one or more operations), a field-programmable gate array (FPGA), or an application-specific integrated circuit (ASIC). In some other instances, the location module 106 may be implemented using a combination of hardware and software. In the present disclosure, operations described as being performed by the location module 106 may include operations that the location module 106 may direct a corresponding system to perform.

The location module 106 may be configured to determine the location information 110 based on the device magnetic field information 104, the orientation information 102 and the magnetic field map 108. In some embodiments, the location module 106 may be configured to determine the location information by performing one or more operations described with respect to a method 400 of FIG. 4 detailed below. The location information 110 may indicate the location that may correspond to the device magnetic field information 104. As such, the location module 106 may be configured to determine a location of the first electronic device based on the device magnetic field information 104. Further, the normalization of the device magnetic field information 104 may make for more accurate location information 110 as compared to not normalizing the device magnetic field information 104.

Modifications, additions, or omissions may be made to FIGS. 1A-1C without departing from the scope of the present disclosure. For example, in some embodiments the orientation information 102 may include inertial information and the location module 106 may be configured to determine other orientation information that may be used for the normalization. Further, the location module 106 may be included in multiple electronic devices or systems such that different operations that may be described as being performed by location module 106 may be performed by different electronic devices or systems.

For example, the location module 106 may be included in an electronic device and may direct the electronic device to make magnetic field and inertial measurements. Additionally or alternatively, the location module 106 of the electronic device may be configured to generate device magnetic field information 104 and orientation information 102 based on the magnetic field and inertial measurements. In these or other embodiments, the location module 106 of the electronic device may be used to determine a location of the electronic device based on the device magnetic field information 104, the orientation information 102, and the magnetic field map 108. In these or other embodiments, the location module 106 may be included in a server and may be configured to obtain the device magnetic field information 104, the orientation information 102, and the magnetic field map 108 and to determine the location of the electronic device based on the device magnetic field information 104, the orientation information 102, and the magnetic field map 108.

Further, the designations and separation of the device magnetic field information 104, the orientation information 102, and the magnetic field map 108 are given for explanatory purposes. Certain embodiments may group or organize the associated information in a different manner than described, but the different types of information described with respect to the device magnetic field information 104, the orientation information 102, and the magnetic field map 108 may be substantially the same.

Figure 2:
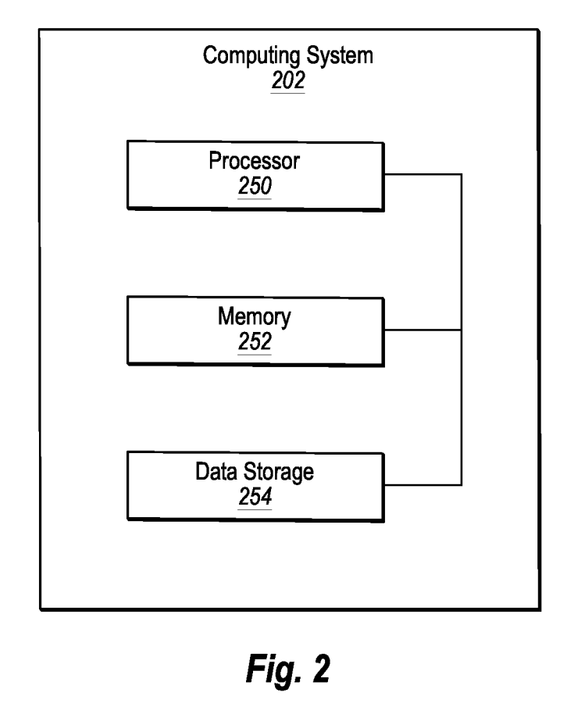
FIG. 2 illustrates a block diagram of an example computing system.

FIG. 2 illustrates a block diagram of an example computing system 202, according to at least one embodiment of the present disclosure. The computing system 202 may be configured to implement one or more operations associated with a location determination module, such as the location module 106 of FIG. 1A, in some embodiments. The computing system 202 may be included in any suitable system, apparatus, or device configured to perform operations associated with determining location of an electronic device. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to perform, individually or collectively, any number of operations described in the present disclosure. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the location determination module may be included in the data storage 254 as program instructions. The processor 250 may fetch the program instructions of the location determination module from the data storage 254 and may load the program instructions of the location determination module in the memory 252. After the program instructions of the location determination module are loaded into memory 252, the processor 250 may execute the program instructions such that the computing system may implement the operations associated with the location determination module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
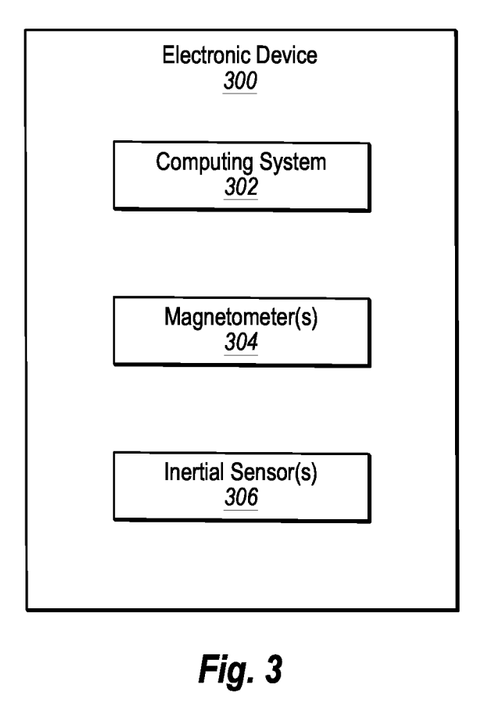
FIG. 3 illustrates a block diagram of an example electronic device.

FIG. 3 illustrates a block diagram of an example electronic device 300, according to at least one embodiment of the present disclosure. The electronic device 300 may be configured to obtain magnetic field information and orientation information. In some embodiments, the electronic device 300 may be an example of electronic devices described above with respect to FIGS. 1A-1C. The electronic device 300 may include any applicable electronic device that may be configured to determine a location based on magnetic field information. For example, the electronic device 300 may include a cellular phone, a smartphone, a personal data assistant (PDA), a laptop computer, a personal computer, a tablet computer, or any other similar device. The electronic device 300 may include a computing system 302, one or more magnetometers 304, and one or more inertial sensors 306.

The magnetometers 304 may include any suitable system, apparatus or device configured to measure a magnetic field. In some embodiments, the magnetometers 304 may be configured to measure a magnitude and a direction of the magnetic field.

The inertial sensors 306 may include sensors that may be configured to measure inertial factors that may be used to generate inertial information. For example, the inertial sensors 306 may be configured to measure acceleration in three dimensions, angular speed in three dimensions, and/or trajectory of movement in three dimensions. In some embodiments, the inertial sensors 306 may include one or more accelerometers or one or more gyroscopes. Additionally or alternatively, the inertial sensors 306 may also include one or more of the magnetometers 304.

The computing system 302 may be analogous to the computing system 202 described above with respect to FIG. 2. The computing system 302 may be configured to obtain information from the magnetometers 304 and the inertial sensors 306.

In some embodiments, the computing system 302 may be configured to obtain magnetic field readings that may be measured by the magnetometers 304. In these or other embodiments, the computing system 302 may be configured to generate magnetic field information (e.g., map magnetic field information or device magnetic field information) based on the magnetic field readings.

Additionally or alternatively, the computing system 302 may be configured to obtain inertial factors that may be measured by the inertial sensors 306. In these or other embodiments, the computing system 302 may be configured to generate inertial information based on the measured inertial factors.

Modifications, additions, or omissions may be made to the electronic device 300 without departing from the scope of the present disclosure. For example, in some embodiments, the electronic device 300 may include any number of other components that may not be explicitly illustrated or described.

Figure 4:
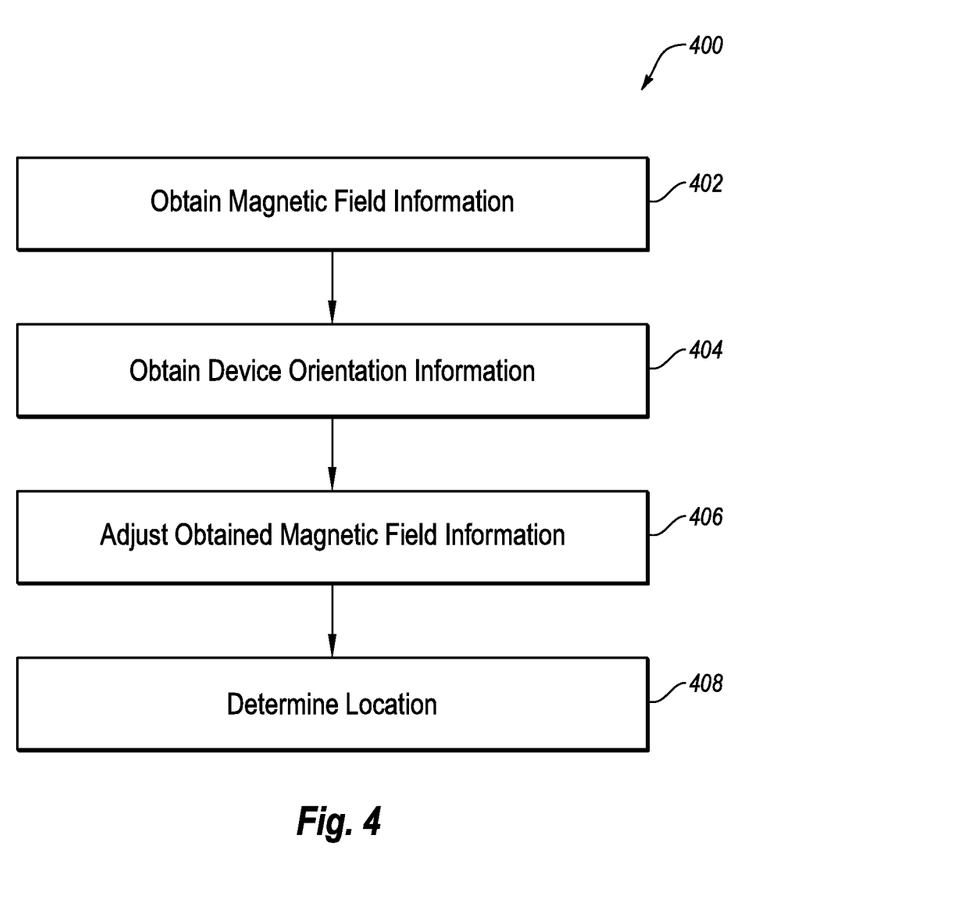
FIG. 4 is a flowchart of an example method of determining a location based on magnetic field information.

FIG. 4 is a flowchart of an example method 400 of determining a location based on magnetic field information, according to at least one embodiment described in the present disclosure. The method 400 may be performed by any suitable system, apparatus, or device. For example, the location module 106 of FIG. 1A or the computing system 202 (as directed by a location module) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where magnetic field information may be obtained. In some embodiments, the magnetic field information may be based on output readings of one or more magnetometers of an electronic device. In some embodiments, the magnetic field information may correspond to a location within a building. For example, the magnetic field information may be obtained based on magnetic field readings that may be made by one or more magnetometers of the electronic device at the location.

In some embodiments, obtaining the magnetic field information may include determining the magnetic field information based on the magnetic field readings. Additionally or alternatively, obtaining the magnetic field information may include receiving magnetic field information that has already been determined based on the magnetic field readings. In some embodiments, the magnetic field information obtained at block 402 may be analogous to the device magnetic field information 104 described above with respect to FIG. 1A.

At block 404 orientation information may be obtained. In some embodiments, the orientation information may be based on output readings of one or more inertial sensors of one or more electronic devices. Further, in some embodiments, the orientation information may include device orientation information that corresponds to an orientation of the electronic device at a time that magnetic field readings used to determine the magnetic field information obtained at block 402 are made. In addition, in some embodiments, the orientation information may indicate the orientation of the electronic device with respect to the map-coordinate system.

In some embodiments, obtaining the orientation information may include determining the orientation information based on the output of the inertial sensors. Additionally or alternatively, obtaining the orientation information may include receiving orientation information that has already been determined based on the output of the inertial sensors. In some embodiments, the orientation information obtained at block 404 may be analogous to the orientation information 102 of FIG. 1A.

At block 406, the magnetic field information obtained at block 402 may be adjusted based on the orientation information obtained at block 404. In some embodiments, the adjustment of the magnetic field information may be such that the magnetic field information is normalized with respect to the map-coordinate system.

For example, in some embodiments, the orientation information may indicate one or more orientation angles of the electronic device with respect to one or more axes of the map-coordinate system. The magnetic field information may then be adjusted based on the orientation angles. In some embodiments, adjustment of the magnetic field information may include rotating the magnetic field information against the orientation angles In particular, in some embodiments, offset angles, e.g., the offset angles "θ," "ω," and "φ" of FIG. 1C, may be obtained from the orientation information obtained at block 404. The offset angles may be used as the orientation angles. Additionally, the magnetic field information obtained at block 402 may include a device magnetic field vector that may be based on the corresponding device-coordinate system. In these or other embodiments, matrix rotation may be applied to the device magnetic field field vector based on the offset angles such that the device magnetic field vector is rotated against the offset angles. The rotation may generate a normalized device magnetic field vector that is normalized with respect to the map-coordinate system.

For example, as described above, the device magnetic field vector 140 of FIG. 1C may be described by the following expression: "$M_1(x_1, y_1, z_1)$." In addition, as indicated above, the map magnetic field vector 130 of FIG. 1B may be described by the following expression: "$M_0(x_0, y_0, z_0)$." Matrix rotation may be applied to the device magnetic field vector 140 based on the offset angles "θ," "ω," and "φ" of FIG. 1C to generate a normalized device magnetic field vector that may be normalized with respect to the map-coordinate system 120. The normalized device magnetic field vector that corresponds to the device magnetic field vector 140 may be substantially equal to the map magnetic field vector 130.

The normalized device magnetic field vector that corresponds to the device magnetic field vector 140 ("corresponding normalized magnetic field vector") may be described by the following expression: "$M_2(x_2, y_2, z_2)$." In the foregoing expression, "$M_2$" may indicate the overall magnitude of the corresponding normalized device magnetic field vector; "$x_2$" may indicate the x-component of the corresponding normalized device magnetic field vector with respect to the x-axis 124; "$y_2$" may indicate the y-component of the corresponding normalized device magnetic field vector with respect to the y-axis 126; and "$z_1$" may indicate the z-component of the corresponding device magnetic field vector with respect to the z-axis 128. Additionally, the corresponding normalized magnetic field vector may be described by the following expression: "$M_2(x_2, y_2, z_2) \approx M_0(x_0, y_0, z_0)$."

In some embodiments, the matrix rotation to generate the normalized magnetic field vector may be performed for rotation in the xy-plane based on the first offset angle "θ" based on the following expression:

$$\begin{pmatrix} M_{x0} \\ M_{y0} \end{pmatrix} \approx \begin{pmatrix} M_{x2} \\ M_{y2} \end{pmatrix} = \begin{pmatrix} \cos\theta & -\sin\theta \\ \sin\theta & \cos\theta \end{pmatrix} \begin{pmatrix} M_{x1} \\ M_{y1} \end{pmatrix}$$

Additionally or alternatively, the matrix rotation to generate the normalized magnetic field vector may be performed for rotation in the yz-plane based on the second offset angle "ω" based on the following expression:

$$\begin{pmatrix} M_{y0} \\ M_{z0} \end{pmatrix} \approx \begin{pmatrix} M_{y2} \\ M_{z2} \end{pmatrix} = \begin{pmatrix} \cos\omega & -\sin\omega \\ \sin\omega & \cos\omega \end{pmatrix} \begin{pmatrix} M_{y1} \\ M_{z1} \end{pmatrix}$$

In these or other embodiments, the matrix rotation to generate the normalized magnetic field vector may be performed for rotation in the xz-plane based on the third offset angle "φ" based on the following expression:

$$\begin{pmatrix} M_{z0} \\ M_{x0} \end{pmatrix} \approx \begin{pmatrix} M_{z2} \\ M_{x2} \end{pmatrix} = \begin{pmatrix} \cos\varphi & -\sin\varphi \\ \sin\varphi & \cos\varphi \end{pmatrix} \begin{pmatrix} M_{z1} \\ M_{x1} \end{pmatrix}$$

At block 408, location information of the electronic device may be determined based on the normalized magnetic field information and a magnetic field map. The location information may correspond to the location of the electronic device at the time that magnetic field readings used to determine the magnetic field information obtained at block 402 are made. In some embodiments, the location information may be determined by comparing the normalized magnetic field information with map magnetic field information included in the magnetic field map to determine map magnetic field information that substantially matches the normalized magnetic field information. The matching map magnetic field information may be correlated with a particular location in the magnetic field map. The particular location may then be determined as being the location of the electronic device at the time that magnetic field readings used to determine the magnetic field information obtained at block 402 are made based on the normalized magnetic field information substantially matching the map magnetic field information that corresponds to the particular location. In some embodiments, the magnetic field map may be generated with respect to a building such that the location of the electronic device within the building may be determined.

Accordingly, the method 400 may be used to determine a location of an electronic device. Modifications, additions, or omissions may be made to the method 400 without departing from the scope of the present disclosure. For example, the operations of method 400 may be implemented in differing order. Additionally or alternatively, two or more operations may be concurrently performed. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, adjustment of the magnetic field information may be based on a degree of offset of the device orientation. In particular, in some embodiments, adjustment of the magnetic field information may be performed in response to determining that one or more device orientation angles (e.g., one or more offset angles) satisfy a threshold.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:
1. A method comprising:
obtaining, by a computing system, magnetic field information that corresponds to a location, the magnetic field information being based on an output reading of a magnetometer of an electronic device;
obtaining, by the computing system, orientation information that corresponds to a device orientation of the electronic device at a time that the output reading of the magnetometer is obtained, the orientation information being based on an output reading of one or more inertial sensors and indicating the device orientation with respect to a map-coordinate system of a magnetic field map; and adjusting, by the computing system, the magnetic field information based on the orientation information to generate normalized magnetic field information that is normalized with respect to the map-coordinate system, the normalized magnetic field information and the magnetic field map being used to determine that the electronic device is at the location at the time that the output reading of the magnetometer is obtained.

2. The method of claim 1, wherein:
the orientation information indicates an orientation angle of the electronic device with respect to one or more axes of the map-coordinate system; and
adjusting the magnetic field information includes adjusting the magnetic field information based on the orientation angle.

3. The method of claim 2, wherein adjusting the magnetic field information based on the orientation angle includes rotating the magnetic field information against the orientation angle.

4. The method of claim 1, wherein:
the magnetic field information includes a magnetic field vector; and
adjusting the magnetic field information includes rotating the magnetic field vector based on the orientation information.

5. The method of claim 4, wherein:
the map-coordinate system includes an x-axis, a y-axis, and a z-axis;
the magnetic field vector includes:
an x-component that corresponds to the x-axis;
a y-component that corresponds to the y-axis and
a z-component that corresponds to the z-axis;
the orientation information indicates:
a first offset angle in an xy-plane of the map-coordinate system;
a second offset angle in an xz-plane of the map-coordinate system; and
a third offset angle in a yz-plane of the map-coordinate system; and
rotating the magnetic field vector includes:
rotating the x-component and the y-component of the magnetic field vector in the xy-plane based on the first offset angle;
rotating the x-component and the z-component of the magnetic field vector in the xz-plane based on the second offset angle; and
rotating the y-component and the z-component of the magnetic field vector in the yz-plane based on the third offset angle.

6. The method of claim 1, wherein:
the orientation information includes first inertial information obtained at the location during generation of the magnetic field map;
the orientation information includes second inertial information obtained at the time that the output reading of the magnetometer is obtained; and
the method further includes determining the device orientation based on the first inertial information and the second inertial information.

7. The method of claim 1, further comprising determining the location of the electronic device based on the normalized magnetic field information and the magnetic field map.

8. The method of claim 1, further comprising:
determining, based on the orientation information, that an angle of the device orientation satisfies a threshold; and
adjusting the magnetic field information in response to determining that the angle satisfies the threshold.

9. One or more non-transitory computer-readable storage media including instructions stored thereon that, in response to being executed by one or more processors, cause a system to perform operations, the operations comprising:
obtaining a magnetic field vector that corresponds to a location within a building, the magnetic field vector being based on an output reading of a magnetometer of an electronic device;
obtaining orientation information that corresponds to a device orientation of the electronic device at a time that the output reading of the magnetometer is obtained, the orientation information being based on an output reading of one or more inertial sensors and indicating the device orientation with respect to a map-coordinate system of a magnetic field map; and
rotating the magnetic field vector based on the orientation information to generate a normalized magnetic field vector that is normalized with respect to the map-coordinate system, the normalized magnetic field vector and the magnetic field map being used to determine a location of the electronic device.

10. The one or more non-transitory computer-readable storage media of claim 9, wherein:
the orientation information indicates an orientation angle of the electronic device with respect to one or more axes of the map-coordinate system; and
rotating the magnetic field vector includes rotating the magnetic field vector based on the orientation angle.

11. The one or more non-transitory computer-readable storage media of claim 10, wherein rotating the magnetic field vector based on the orientation angle includes rotating the magnetic field vector against the orientation angle.

12. The one or more non-transitory computer-readable storage media of claim 9, wherein:
the map-coordinate system includes an x-axis, a y-axis, and a z-axis;
the magnetic field vector includes:
an x-component that corresponds to the x-axis;
a y-component that corresponds to the y-axis and
a z-component that corresponds to the z-axis;
the orientation information indicates:
a first offset angle in an xy-plane of the map-coordinate system;
a second offset angle in an xz-plane of the map-coordinate system; and
a third offset angle in a yz-plane of the map-coordinate system; and rotating the magnetic field vector based on the orientation information includes:
rotating the x-component and the y-component of the magnetic field vector in the xy-plane based on the first offset angle;
rotating the x-component and the z-component of the magnetic field vector in the xz-plane based on the second offset angle; and
rotating the y-component and the z-component of the magnetic field vector in the yz-plane based on the third offset angle.

13. The one or more non-transitory computer-readable storage media of claim 9, wherein:
the orientation information includes first inertial information obtained at the location during generation of the magnetic field map;

the orientation information includes second inertial information obtained at the time that the output reading of the magnetometer is obtained; and the operations further include determining the device orientation based on the first inertial information and the second inertial information.

14. The one or more non-transitory computer-readable storage media of claim 9, wherein the operations further comprise determining the location of the electronic device within the building based on the normalized magnetic field vector and the magnetic field map.

15. The one or more non-transitory computer-readable storage media of claim 9, wherein the operations further comprise:

determining, based on the orientation information, that an angle of the device orientation satisfies a threshold; and rotating the magnetic field vector in response to determining that the angle satisfies the threshold.

16. An electronic device comprising:

a magnetometer configured to generate a magnetic output reading that indicates a magnitude and a direction of a magnetic field;

an inertial sensor configured to generate an inertial output reading that indicates an orientation of the electronic device;

one or more non-transitory computer-readable storage media including instructions stored thereon; and one or more processors configured to receive the magnetic output reading and the inertial output reading and configured to, based on the instructions stored on the one or more computer-readable storage media:

obtain, based on the magnetic output reading, magnetic field information that corresponds to a location;

obtain, based on the inertial output reading, orientation information that corresponds to a device orientation of the electronic device at a time that the magnetic output reading, the orientation information indicating the device orientation with respect to a map-coordinate system of a magnetic field map;

adjust the magnetic field information based on the orientation information to generate normalized magnetic field information that is normalized with respect to the map-coordinate system; and determine, based on the normalized magnetic field information and the magnetic field map, that the electronic device is at the location at the time that the magnetic output reading is obtained.

17. The electronic device of claim 16, wherein:

the orientation information indicates an orientation angle of the electronic device with respect to one or more axes of the map-coordinate system; and the one or more processors are configured to adjust the magnetic field information based on the orientation angle.

18. The electronic device of claim 17, wherein the one or more processors are configured to adjust the magnetic field information based on the orientation angle by rotating the magnetic field information against the orientation angle.

19. The electronic device of claim 16, wherein:

the magnetic field information includes a magnetic field vector; and the one or more processors are configured to rotate the magnetic field vector based on the orientation information to adjust the magnetic field information.

20. The electronic device of claim 19, wherein:

the map-coordinate system includes an x-axis, a y-axis, and a z-axis;

the magnetic field vector includes:

an x-component that corresponds to the x-axis;

a y-component that corresponds to the y-axis and a z-component that corresponds to the z-axis;

the one or more processors are configured to obtain as orientation information:

a first offset angle in an xy-plane of the map-coordinate system;

a second offset angle in an xz-plane of the map-coordinate system; and a third offset angle in a yz-plane of the map-coordinate system; and the one or more processors are configured to rotate the magnetic field vector by:

rotating the x-component and the y-component of the magnetic field vector in the xy-plane based on the first offset angle;

rotating the x-component and the z-component of the magnetic field vector in the xz-plane based on the second offset angle; and rotating the y-component and the z-component of the magnetic field vector in the yz-plane based on the third offset angle.

* * * * *